UNITED STATES PATENT OFFICE.

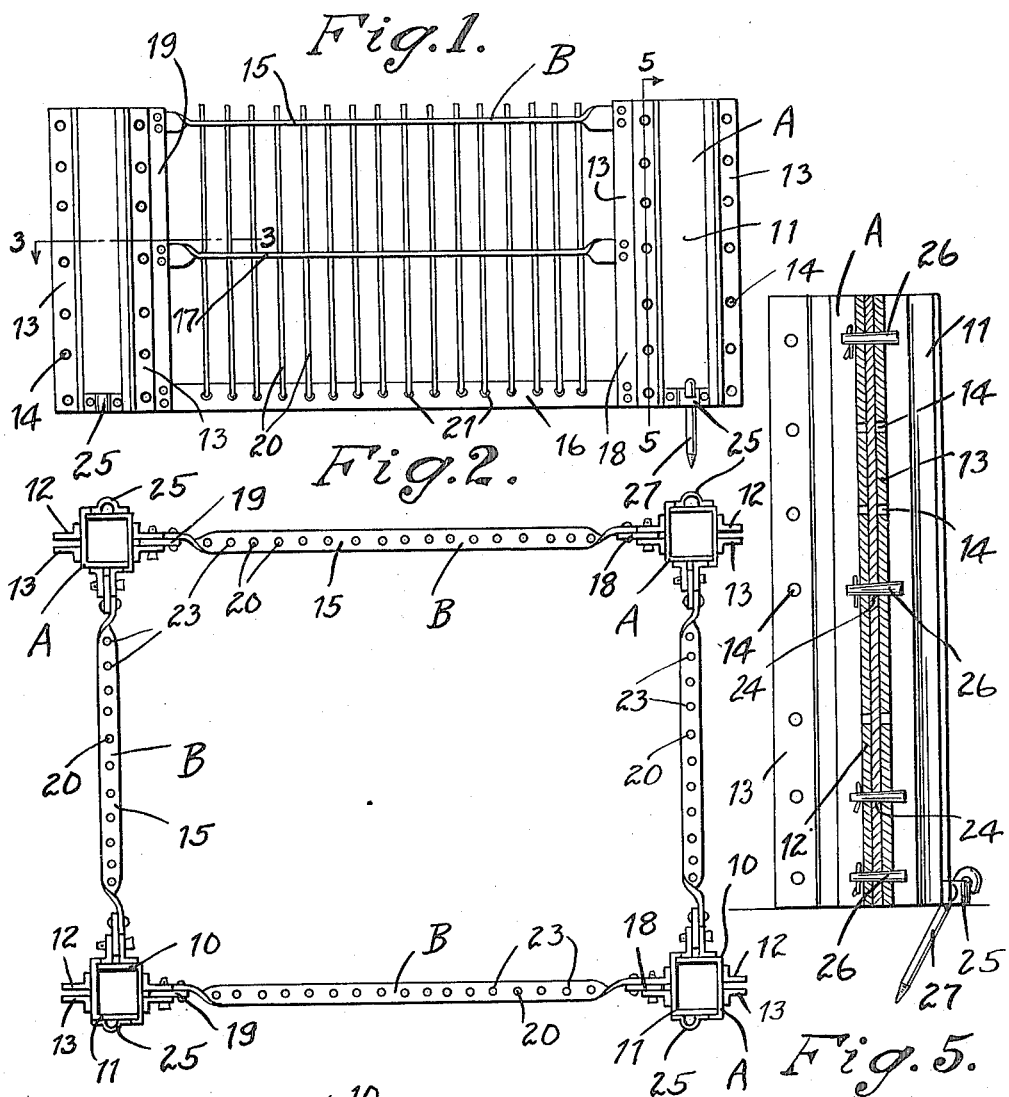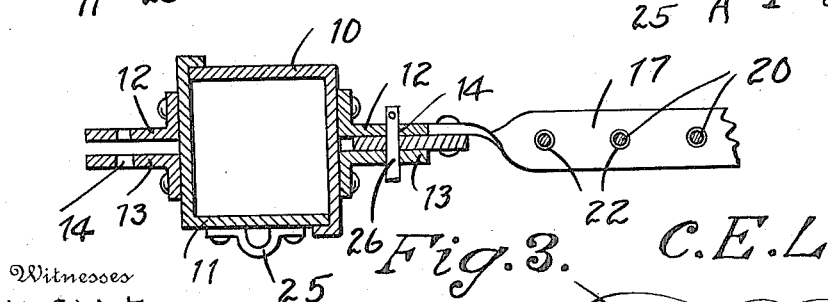

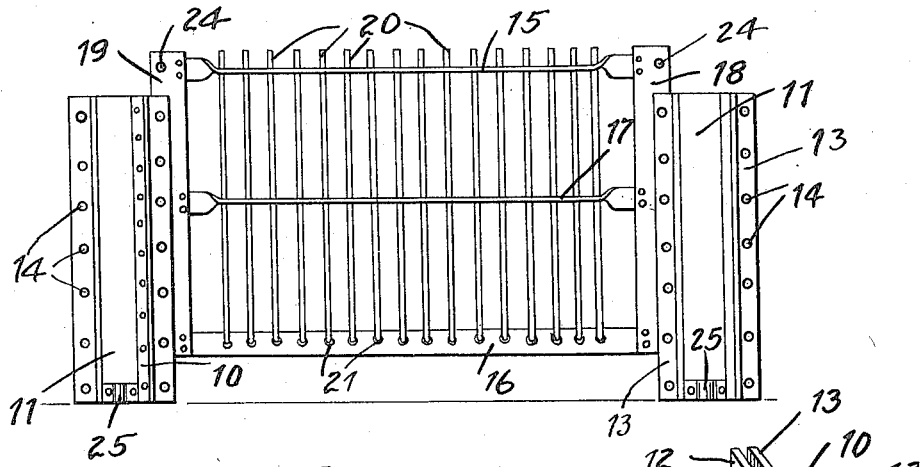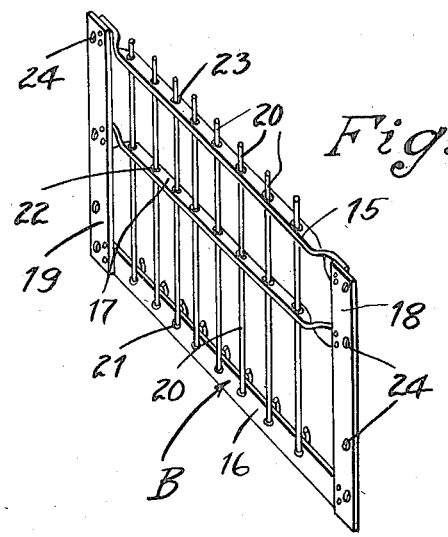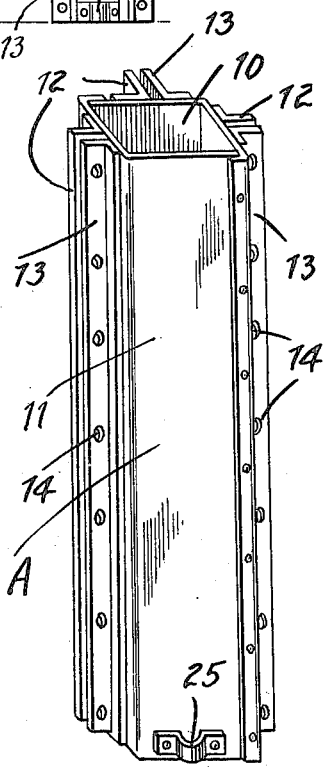

CHARLES E. LIGGETT, OF KIRKWOOD, ILLINOIS.

PORTABLE STOCK-INCLOSURE.

1,160,728.  Specification of Letters Patent.  Patented Nov. 16, 1915.

Application filed April 7, 1914. Serial No. 830,248.

*To all whom it may concern:*

Be it known that I, CHARLES E. LIGGETT, a citizen of the United States, residing at Kirkwood, in the county of Warren, State of Illinois, have invented certain new and useful Improvements in Portable Stock-Inclosures; and I do hereby declare the following to be a full, clear, and exact description of the invention, such as will enable others skilled in the art to which it appertains to make and use the same.

This invention relates to portable stock inclosures.

The object of the invention resides in the provision of a portable stock inclosure embodying a compact structure which will be light and durable and which is formed of separate sections adapted to be easily and quickly detached from each other whereby the inclosure may be taken down, transported and erected in another locality.

A further object of the invention resides in the provision of a stock inclosure of the character named in which desired side members may be supported in different vertical adjustments to afford a desired open space between the bottom of the side member and the ground.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a portable inclosure constructed in accordance with the invention; Fig. 2, a plan view of same; Fig. 3, a partial horizontal section of the inclosure; Fig. 4, a view similar to Fig. 1 showing one of the side members of the inclosure adjusted vertically; Fig. 5, a section on the line 5—5 of Fig. 1; Fig. 6, a perspective view of one of the side members of the inclosure; Fig. 7, a perspective view of one of the corner members of the inclosure showing the manner of anchoring same to the ground, and Fig. 8, a perspective view of the anchoring pin or stake.

Referring to the drawings the invention is shown as comprising corner members A and side members B. Each of the corner members A is of tubular formation and is formed of angle sections 10 and 11 riveted together. Secured to three sides of each corner member A are spaced vertical securing flanges 12 and 13 provided at spaced points with registering openings 14 for a purpose that will presently appear. Each of the side members B comprises top and bottom members 15 and 16 respectively, an intermediate member 17 and side members 18 and 19 connecting the ends of the top, bottom and intermediate members. The top and intermediate members 15 and 17 are formed of metal strips having their terminals bent one quarter of a turn so that the widest portion of said strips will be disposed in a plane extending transversely of the corner members A. Each side member B further embodies a plurality of rods 20 having their lower ends extended through openings 21 respectively of the bottom member 16 and then clenched. These rods 20 also pass through alined openings 22 and 23 formed in the intermediate and top members 17 and 15 respectively. The side members 18 and 19 are provided respectively with a plurality of openings 24 for a purpose that will presently appear. Secured on the side of each corner member A which is not provided with flanges 12 and 13 and at the lower end of said corner member is an eye member 25.

In assembling the inclosure the side members 18 and 19 are inserted between the flanges 12 and 13 of adjacent corner members A and the openings 24 moved into registration with the openings 14 when pins 26 are passed through registering openings to detachably secure the side member to the corner members. After all the side members B have been secured in place anchor stakes 27 are engaged through the eye members 25 to enhance the strength of the structure. If it is desired to raise one of the side members B the pins 26 are removed and the side member elevated until the opening 24 again comes in registration with the openings 14 when detachable pins 26 are inserted through the registering openings and the side member thus held elevated with its bottom member in spaced relation to the ground.

What is claimed is:—

A fence section comprising members formed of separate portions each of which is right angular in cross section and has the free end of one of its arms bent inwardly to form a securing flange overlapping an arm of the other portion, fastening devices engaged through said flanges and the abutting arm, spaced vertical strips secured to the adjacent sides of the corner members, plates adjustably secured between said strips, longitudinal members formed of metallic strips having their terminal portions bent to dispose their intermediate portions transversely of the corner members and having their terminal portions secured respectively to said plates, and rods engaged through the longitudinal members.

In testimony whereof, I affix my signature, in the presence of two witnesses.

CHARLES E. LIGGETT.

Witnesses:
J. A. TUBBS,
F. W. NORMAN.

Copies of this patent may be obtained for five cents each, by addressing the "Commissioner of Patents, Washington, D. C."